United States Patent
Keladi

(10) Patent No.: US 8,271,993 B2
(45) Date of Patent: Sep. 18, 2012

(54) METHOD AND APPARATUS FOR FACILITATING PIPELINE THROUGHPUT

(75) Inventor: Sridhar Keladi, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1286 days.

(21) Appl. No.: 11/885,395

(22) PCT Filed: Mar. 4, 2005

(86) PCT No.: PCT/IN2005/000070
§ 371 (c)(1),
(2), (4) Date: Aug. 30, 2007

(87) PCT Pub. No.: WO2006/092807
PCT Pub. Date: Sep. 8, 2006

(65) Prior Publication Data
US 2008/0168464 A1    Jul. 10, 2008

(51) Int. Cl.
*G06F 9/46* (2006.01)

(52) U.S. Cl. .................................................. 718/106

(58) Field of Classification Search .................. 718/106
See application file for complete search history.

(56) References Cited

U.S. PATENT DOCUMENTS

| | | | |
|---|---|---|---|
| 4,073,005 A * | 2/1978 | Parkin | 718/104 |
| 5,317,734 A | 5/1994 | Gupta | |
| 5,452,461 A | 9/1995 | Umekita et al. | |
| 5,535,387 A | 7/1996 | Matsuoka et al. | |
| 5,787,272 A | 7/1998 | Gupta et al. | |
| 6,049,860 A | 4/2000 | Krygowski et al. | |
| 6,370,600 B1 | 4/2002 | Hughes et al. | |
| 6,609,193 B1 | 8/2003 | Douglas | |
| 2002/0199085 A1 | 12/2002 | Norden et al. | |

FOREIGN PATENT DOCUMENTS

| | | |
|---|---|---|
| EP | 1206084 | 5/2002 |
| JP | 02-028862 | 1/1990 |

* cited by examiner

*Primary Examiner* — Meng An
*Assistant Examiner* — Blake Kumabe

(57) ABSTRACT

In an embodiment of the present invention there is provided a method of facilitating pipelines throughput in a pipeline processor system including at least one producer processor/consumer processor pair. The method includes the step of controlling (22) the producer processor/consumer processor pair to allow them to run out-of-sync without violating dependency (21,23,26).

22 Claims, 2 Drawing Sheets

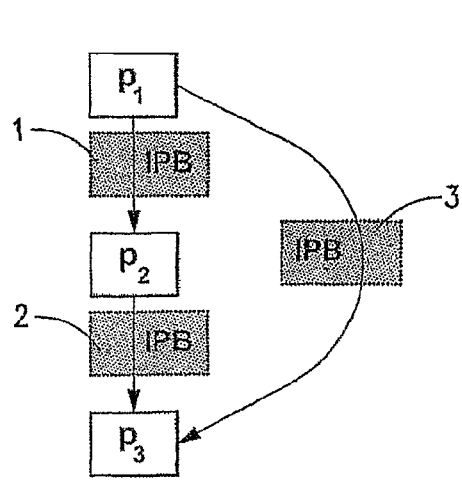
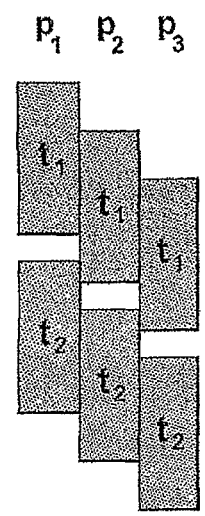
Fig. 1            Fig. 2
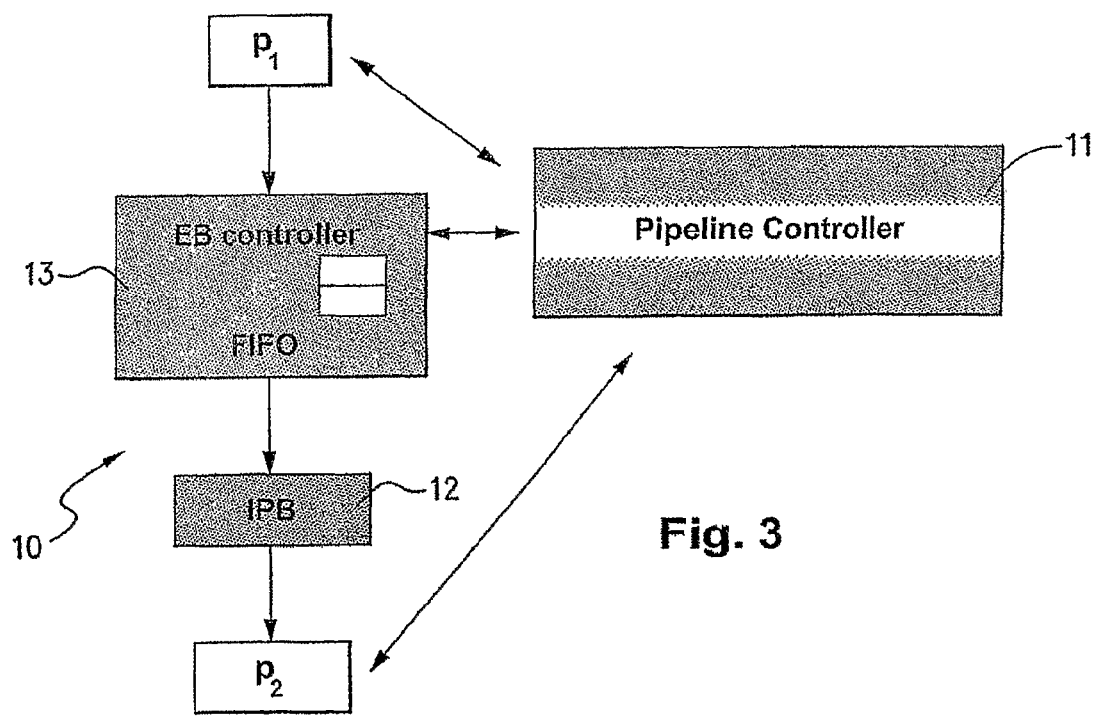
Fig. 3

METHOD AND APPARATUS FOR FACILITATING PIPELINE THROUGHPUT

FIELD OF THE INVENTION

The present invention relates to a method and apparatus for facilitating pipeline throughput in a pipeline processor system, and more particularly, but not exclusively, to a method and apparatus for facilitating pipeline throughput through a synchronous pipeline of non-programmable processors.

BACKGROUND OF THE INVENTION

In a computing environment, a pipeline is a series of functional units, or processors, which perform a task in several steps. Each processor takes inputs and produces outputs which are stored in a buffer. One processor's output buffer is therefore the next processor's input buffer. This arrangement allows processors in a pipeline to work in parallel thus giving greater throughput than if each input had to pass through a whole pipeline before the next input could enter. The processor outputting to the buffer is usually termed the "producer" and the processor receiving input from the buffer is usually termed the "consumer". Pipelines will generally have a plurality of and usually many producer processor/consumer processor pairs.

Pipelines are used for many algorithms, including particularly (but not exclusively), algorithms used in the imaging, audio/video and wireless domains. These algorithms usually have to be implemented for very high performance. Pipeline processors for high performance operation are often implemented in hardware, and each of these hardwired processors is known as a non-programmable processor.

All processors in a pipeline system are scheduled and hardwired to work in synchronicity (termed synchronous scheduling) with each other to meet the data dependencies between them. Intra-processor controllers handle the execution within each processor. A single inter-processor or pipeline controller handles the system level control such as starting tasks on the processors at specified times and reporting the readiness of the pipeline to accept the next task.

At runtime, operations may generate stalls to some processors. A stall will take a processor out-of-sync with other processors resulting in incorrect execution. Such synchronisation variations are a significant problem for pipelines.

One solution for the pipeline controller is to operate a common or single stall domain for the pipeline that stalls every processor for a stall to any one processor. This has the effect of stopping operation of pipeline throughput while the processors are stalled and brought back into sync with each other. This approach has a severe negative impact on throughput of the pipeline, and can drastically reduce overall performance. A single stall domain solution also requires a special "flush" command and circuitry to flush the last tasks from the pipeline.

SUMMARY OF THE INVENTION

In an embodiment of a method of facilitating pipeline throughput in a synchronous pipeline system including at least one producer process/consumer process pair, the embodiment includes the step of controlling the producer process/consumer process pair to allow them to run out-of-sync without violating dependency.

BRIEF DESCRIPTION OF THE DRAWINGS

Features and advantages of the present invention will become apparent from the following description of an embodiment thereof, by way of example only, with reference to the accompanying drawings, in which FIGS. 1 and 2 are diagrams illustrating operation of a conventional synchronous pipeline of non-programmable processors, FIG. 3 is a diagram of a pipeline arrangement in accordance with an embodiment of the present invention.

DETAILED DESCRIPTION

Figure 4:
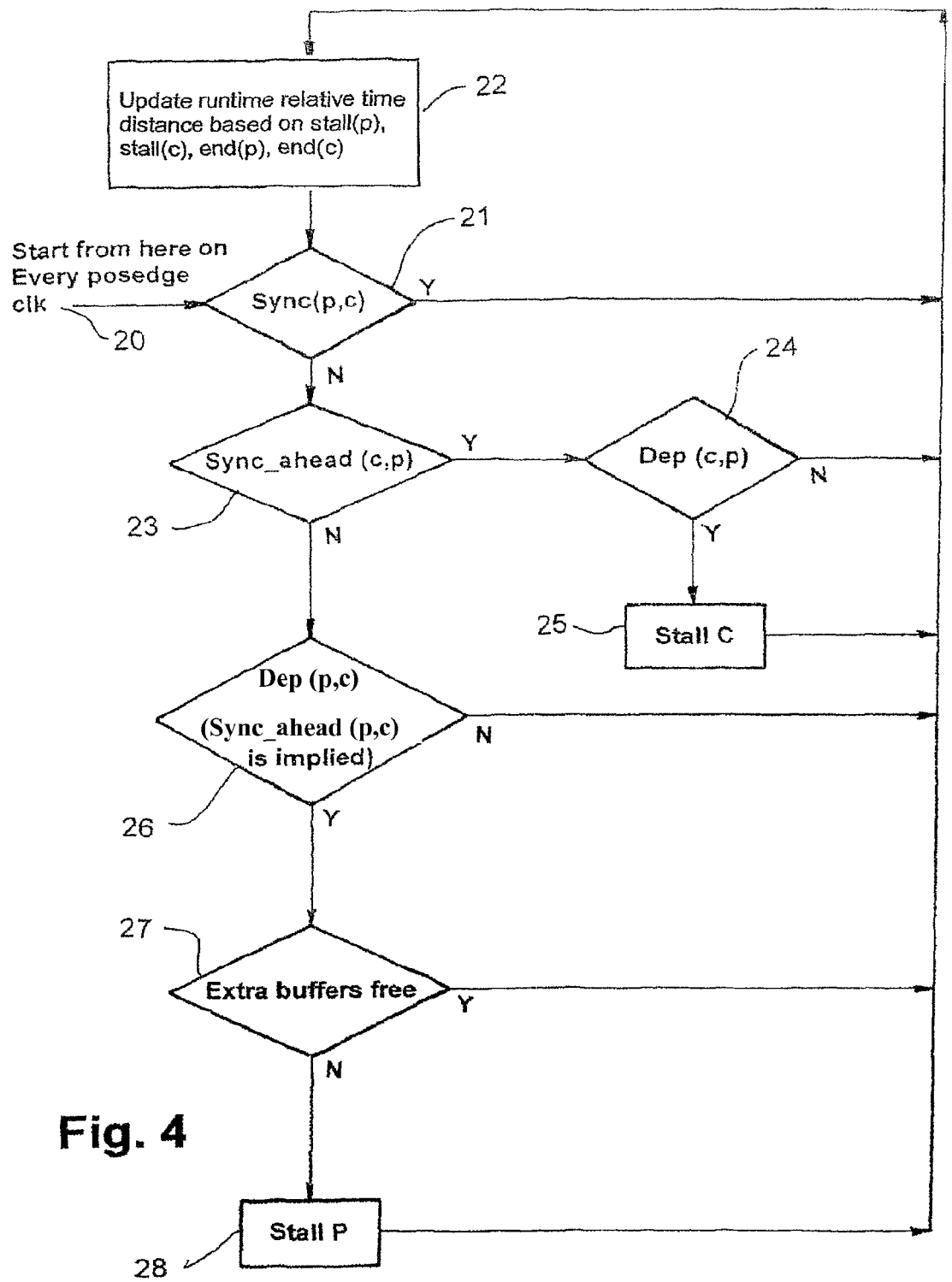
FIG. 4 is a flow diagram illustrating operation of an embodiment of the present invention.

Before describing in detail an embodiment of a method and apparatus of the present invention, conventional synchronous pipeline operation will be described with reference to FIGS. 1 and 2.

Many algorithms in the imaging, audio/video, and wireless domains are built using a series of computations. Each computation is coded as a logical computation block. The data from outside is input to some blocks, the computation output of these blocks are fed to some subsequent blocks, and the result is output from the final blocks.

These algorithms have to be implemented for a very high performance. One of the most common ways is to implement the logical computation blocks of the algorithm in hardware. Each of these hardwired blocks is a non-programmable processor that performs the computation. Intermediate or inter-processor buffers (IPBs) exist between processors to hold the output of one processor to be fed to another processor. The overall system formed by the processors connected via buffers can be viewed as a directed acyclic graph or DAG. Nodes in the DAG represent processors and a directed edge from one processor to another represents the producer-consumer relationship between processors. An edge implies existence of one or more Inter Processor Buffers or IPBs.

Throughput of the system is (output_data_rate/input_data_rate), where inputs and outputs are observed at the system boundary. High throughput requirement demands parallel execution across processors termed as system level parallelism. Apart from increasing the throughput, it reduces the IPB sizes, as the system does not need to buffer all the data between processors as in sequential execution case. High throughput can be achieved additionally by task pipelining. A task represents one complete execution of the system for a data set. There is no data flow across tasks and tasks are hence independent of one another. A pipelined system can accept the next task even when some older tasks are still alive in the system. The processors themselves in the system can be viewed as pipeline stages and the task execution proceeds from early stages to the later stages. FIG. 1 shows a DAG. FIG. 2 shows system level parallelism and task pipelining. In the figures, $p_1$, $p_2$, $p_3$, are processors and $t_1$, $t_2$ are tasks.

The processors $p_1$, $p_2$, $p_3$ form producer/consumer pairs. $P_1$ is a producer of data for $p_2$ (consumer). $P_3$ is a consumer of data from processor $p_2$ (producer). In addition, $p_3$ is also a consumer of processor $P_1$. Directed edges are connected via IPBs 1, 2, 3.

Minimum inter task interval (MITI) is a throughput indicator that drives pipeline design. The pipeline should be able to accept a new task every MITI cycles to meet the throughput. A synchronous pipeline design creates a schedule for processor operations, designs minimal IPB's and specifies a start time for each processor. The schedule is the same for every task. The schedule for operations is hardwired to build the non-programmable processors. Intra-processor controllers execute the schedule inside the processors. The start times implicitly specify a relative time interval or distance (in clock cycles) between processors to meet dependencies. A pipeline controller exists for the system that starts the processors at specified start times. It also signals the outside world about its readiness to accept the next task after MITI cycles. The schedule is said to be tight because, even a ±1 cycle deviation from the relative time distance specified could possibly result in an incorrect execution.

Consider an example. Let the schedule specify that processor $p_1$ has to be 'd' cycles ahead of $p_2$. If $p_1$ runs > d cycles ahead of $p_2$, we say that $p_1$ is sync-ahead of $p_2$. If $p_2$ runs > d cycles behind $p_1$, we say that $p_2$ is sync-ahead of $p_1$. In both these cases, ($p_1$, $p_2$) pair is said to be out-of-sync. Under all other situations, ($p_1$, $p_2$) pair is said to be in sync.

During the pipeline execution, operations in some processors may generate a stall to that processor. A stall to a processor will take it out-of-sync with respect to other processors resulting in incorrect execution. A single stall domain solution for the pipeline controller will have all the processors in the pipeline under a common stall domain. The pipeline controller will stall every processor in the pipeline for stall to any processor thus maintaining the relative time distances. The start time counters and MITI counter will count only non-stalling cycles thus guaranteeing the correctness. Runtime stalls have severe impact on the throughput. Single stall domain solution is the easiest, but results in very poor performance.

An embodiment of the present invention will now be described in relation to FIG. 2. In this embodiment, processors can be allowed to run out-of-sync at times, without upsetting operation of the pipeline.

In FIG. 3, a synchronous pipeline of hardwired processors is represented generally by reference numeral 10. Only one section of the pipeline 10 is illustrated in the figure. This shows a producer processor $p_1$ and consumer processor $p_2$. The pipeline controller 11 is also illustrated. Also illustrated is an IPB 12, and, additionally in this embodiment of the invention, a further inter-processor element 13. The pipeline controller 11 is able to communicate with the processors $p_1$ and $p_2$ and also the further inter-processor element 13. Note that in a practical implementation where there are multiple processors, a further inter-processor element 13 will be included between each producer/consumer pair in the pipeline and the pipeline controller will have control of each producer/consumer pair as well as the additional inter-processor elements.

In this embodiment, a control means, in this example being pipeline controller 11, is arranged to control a producer processor $p_1$ and consumer processor $p_2$ pair to allow them to operate out-of-sync without violating dependency. The pipeline controller 11 monitors dependency of the producer/consumer pair and allows out-of-sync operation in a number of operating circumstances. One operating circumstance includes the condition where the consumer processor is running sync-ahead of the producer processor and the consumer processor is executing a task older than a task being executed by the producer processor.

Another operating condition includes the condition of the producer processor running sync-ahead of the consumer processor and the producer processor is executing a task older than a task being executed by the producer processor.

The further inter-processor element 13 is in this embodiment a buffer and this is arranged to implement a further buffering delay for data transfer when the producer processor is running sync-ahead of the consumer processor.

The pipeline controller in fact operates as a flexible pipeline controller for a tightly scheduled synchronous pipeline. When a processor gets a stall, other processors are allowed to run under some circumstances. This can take the processors out-of-sync at times, but we still have correct execution. This approach reduces the overall delay a pipeline has to undergo, thus providing performance improvement over single stall domain solution.

Out-Of-Sync Runs

We first describe when and how we allow out-of-sync runs of processors. In this embodiment dependency is not violated for every producer-consumer pair, which in turn facilitates correctness of the entire system.

If a consumer c ($p_2$ in FIG. 3) runs sync-ahead of a producer p ($p_1$ in FIG. 3), it may read an IPB value yet to be written. However, if c is executing a task older than p's, then p would have produced all values that c needs. Hence, c can ignore p's stalls and go sync-ahead. Secondly, if p runs sync-ahead of c, it may overwrite an IPB value that is yet to be read. However, if p is executing a task older than c's, then p won't produce any more writes to IPB (as c has completed the task). Hence, p can ignore c's stalls and go sync-ahead. A processor $p_1$ executing an older task than $p_2$ implies that $p_1$ is not dependent on $p_2$. dep($p_1$, $p_2$) is a Boolean variable whose value specifies if $p_1$ is dependent on $p_2$ at this point of time.

Producer p executing a task older than consumer c's is legitimate, but rare. In order to provide more chances for p to run sync-ahead of c, we propose the following. Between the producer and the IPB 12, we provide some extra buffers or EBs 13. P can be allowed to run sync-ahead of c, if the EB 13 is not full. Writes when p is sync-ahead of c, will go to the EBs thus avoiding IPB data overwrites before read. The EB 13 data moves to the IPB 12 at appropriate times and the consumer always reads from the IPB 12.

Processor Stall Signalling

Pipeline controller 11 stalls processors when unsafe to run. It has information on the runtime relative time distance between every producer-consumer pair, the varying consumer's dependency on producer and visa versa, and the EB state (full or not). Using this information, it issues stall signals to the processors.

stall(P)=own_stall(P) OR (for all producer i feeding to P OR (stall_dueto_prducer_i(P)))

OR (for all consumer j reading from P OR (stall_dueto_consumer_j(P))) OR (done_task(P) & Istart(P))

P may stall due to its own operations, or stall induced due to its producers or consumers. It has to stall if its current task is complete (shown by level done_task signal) and start (pulse input signal) is not issued to P.

stall_due_to_consumer_j(P)=dep(P,j) & sync_ahead(P,j) & P_to_j_eb_full stall_due_to_producer_i(P)=dep(p,i) & sync_ahead(P,i).

Relative Time Distance Maintenance and MITI Honouring

The pipeline controller 11 maintains relative time distance r between every producer (p)-consumer c pair at runtime. The r computation is as shown (note: they are if, and not elseif conditions).

if(stall(p)) r−−; if(stall(c)) r++; if (end(p)) r+=a(p); if(end (c)) r−=a(c);

Incrementing and decrementing r by a(p) and a(c) need explanation. MITI honouring is to ensure that the processors execute every task without violating dependencies. Our solution does not have any explicit control to ensure MITI. We achieve this by manipulating r and the stall circuitry will stall the processor till safety. a(P)=MITI−execution_time(P) represents the number of cycles processor P has to stay idle between tasks to honour MITI. Incrementing r by a(p) will signal sync_ahead(p, c) and hence stall p till safety. Decrementing r by a(c) will signal sync_ahead(c, p) and hence stall c till safety.

Processor Starts and Pipeline Ready

Here we describe, how to start the processors and how to signal pipeline's readiness to accept the next task. Let start and end of tasks on processors represent events. From the schedule, a cumulative ordering of start and end events on processors can be obtained. Such an order of events in non-decreasing order of event time is known as an event_order or eorder. Even though we allow out-of-sync runs, we restrict every task execution to happen as per eorder. This deterministic execution allows for a simple token passing mechanism to be used for starting the processors as well as a simple logic (using start and end events) to track dependency between processors.

The token passing mechanism can be implemented by having an allow_<event> token for every task. The first starting processor gets the allow_start token on start command to the pipeline. A processor can execute an event (start or end) if it is done with the task and it has the allow_<event> token for its event, and its eorder_successor is ready to accept the token. The last condition ensures that a token passed to allow the next event in the eorder is never lost. allow_start and allow end token storages (1-bit each) exist per processor.

Readiness of the pipeline to accept next task is signalled (a level signal) when the first starting processor in the eorder does not hold the allow_start token.

Note that, the starts don't consider the desired time distances between processors. The pipeline readiness signalling does not consider the MITI. These are automatically taken care of by the stall decision modules (described earlier) of the pipeline controller, that will stall processors till safety.

Dependency Computation $dep(p, c)$ and $dep(c, p)$ are maintained for every producer-consumer pair. Dependency between a pair can be determined by drawing the schedule for many tasks and inspecting the steady state. $dep(p_1, p_2)$ exists at times when $p_1$ is executing the same or newer task than $p_2$'s, and does not exist when $p_1$ is executing an older task than $p_2$'s. During the execution, the dependency can be easily tracked using start and end events on processors. For example, in FIG. 2, $dep(p_1, p_2)$ starts at $start(p_2)$ and ends at $end(p_1)$. The dependency decision logic can be computed for all types of producer-consumer schedules.

Our solution solves the flushing problem that exists with single stall domains. When some processors stall waiting for the start of the (last+1)'th task (which never arrives), the processors still executing the last tasks also stall due to a common stall domain. The last tasks are flushed using a special flush input signal and circuitry. Our solution automatically drains or flushes the last tasks as the dep variables would show false.

EB Controller

An EB controller exists with every EB 13. The IPB writes always go through the EB controller. If p is sync-ahead of c, EB controller writes to the EB. Otherwise, it passes the data through to the IPB. The EB is modelled as a FIFO with time-stamped data. When the data is first written to the EB, $time\_stamp = r(p, c) - d(p, c)$, where r and d are the runtime and specified relative time distances respectively. The time-stamp of data items in the EB reduces by 1 for every non-stalling cycle of consumer. When the time-stamp of the EB FIFO head data becomes 0, the data is in sync with the consumer, and the head is flushed to the IPB. Consumer always reads from IPB.

Pipeline performance will increase with EB FIFO depth. However, we have found a 20-25% improvement (over single stall domain) with EB size of just 1 on a 2 processor, 1 IPB pipeline executing 10 tasks with random stalls.

An example of operation of a producer/consumer pair controlled in accordance with an embodiment of the invention will now be described with reference to FIG. 4.

At each clock cycle 20, the pipeline controller 11 runs an algorithm as shown in overview of FIG. 4. At 21, a determination is made as to whether the producer and consumer ($p_1$ and $p_2$ in FIG. 3) are synchronised. If yes (Y) then operation is fine and the runtime relative time distance update step 22 is executed. The routines waits for the next clock cycle 20.

If a determination is made at step 21 that p and c are not synchronised (N), then the routine proceeds to step 23. At step 23 determination is made as to whether c is sync-ahead of p. If yes, then at step 24 a determination is made as to whether c is dependent on p. Dependency (c,p) is determined in relation to the conditions discussed above. That is, if c is executing a task older than p, then c can continue running sync-ahead i.e. not dependent on p. In this case (N), c not dependent on p, the next step in the routine is to update the runtime relative time distance between c and p (step 22).

If, however, at step 24, c is dependent on p (i.e. c is not executing a task older than p) then at step 25 c is stalled to maintain synchronisation. Runtime relative time distance is then adjusted at step 22, and the next clock cycle 20 is awaited.

If, at step 23 it is determined that c is not sync-ahead of p, then at step 26 it is assumed that p is running sync-ahead of c and a determination is made as to whether p is dependent on c. P will not be dependent on c in the circumstance where p is executing a task older than c's, and if this is the case (N), p and c can continue operation and the runtime relative time distance 22 is updated and the next clock cycle 20 awaited.

If, however, p is dependent on c (which is commonly the case) then at step 27 a determination is made as to whether the EB is free. If it is free (Y) it is loaded with data from the producer at throughput and can continue without violating dependency. Runtime relative time distance 22 is updated and the next clock cycle 20 is awaited.

The runtime relative time distance adjustment depends on stall(p), stall(c), end(p) and end(c). At end(p) and end(c), adjustment is required to ensure the MITI requirement. For this reason, the runtime relative time distance adjustment block is executed every cycle.

If, at step 27, it is determined that the EB is full, however, then the processor p is individually stalled at step 28.

It can thus be seen that the pipeline will continue to operate and stalls will only be implemented in the circumstances discussed in relation to FIG. 4. Stalls are implemented on an individual basis (not on a pipeline basis), however, so the pipeline as a whole will continue operating unless all processes are stalled. No flushing process is required, as discussed above, as operation of the system causes flushing to occur automatically.

The above described embodiment relates to synchronous hardwired processors in a pipeline. The invention can just as well be applied to the software pipeline and is not limited to hardware.

Modifications and variations as would be apparent to a skilled addressee are deemed to be within the scope of the present invention.

What is claimed is:

1. A method of facilitating pipeline throughput in a synchronous pipeline system including a producer/consumer pair having a producer and a consumer, the method comprising:

controlling the producer/consumer pair to allow the producer and consumer in the producer/consumer pair to run out-of-sync without violating dependency, wherein the controlling comprises:
monitoring dependency of the producer and consumer in the producer/consumer pair, wherein monitoring the dependency comprises monitoring an age of a task of the producer relative to an age of a task of the consumer; and
determining that the producer and consumer are allowed to run out-of-sync in response to detecting that one of plural conditions is present, a first of the plural conditions including the consumer being sync-ahead of the producer and the consumer executing a task older than a task of the producer, and a second of the plural conditions including the producer being sync-ahead of the consumer and the producer executing a task older than a task of the consumer.

2. A method in accordance with claim 1, wherein the controlling includes controlling an inter-processor operation between a producer processor and a consumer processor in the producer/consumer pair.

3. A method in accordance with claim 2, wherein the inter-processor operation includes a buffering of data transfer between the producer processor and consumer processor, and the controlling comprises introducing a further buffering delay for data transfer when the producer processor is running sync-ahead of the consumer processor.

4. A method in accordance with claim 3, wherein the controlling comprises varying the time of the further buffering delay in dependence on the time by which the producer processor is running sync-ahead of the consumer processor.

5. A method in accordance with claim 1, further comprising implementing a stall domain, wherein at least one of the producer and consumer is individually stalled.

6. A method in accordance with claim 1, further comprising adjusting a runtime relative time distance between the producer and consumer in order to maintain synchronization.

7. A method in accordance with claim 1, further comprising flagging when an individual one of the producer and consumer has started and ended a task, to enable tracking of the tasks that the individual one of the producer and consumer is implementing.

8. A method in accordance with claim 1, wherein the controlling further comprises:
in response to determining that the consumer is sync-ahead of the producer but the consumer is executing a task that is the same as or newer than a task of the producer, stalling the consumer.

9. A method in accordance with claim 1, wherein the controlling further comprises:
in response to determining that the producer is sync-ahead of the consumer but the producer is executing a task that is the same as or newer than a task of the consumer, stalling the producer.

10. A method in accordance with claim 1, wherein the controlling further comprises:
in response to determining that the producer is sync-ahead of the consumer but the producer is executing a task that is the same as or newer than a task of the consumer,
stall the producer in response to determining that a buffer between the producer and consumer is full; and
deciding to not stall the producer in response to determining that the buffer is not full.

11. A method in accordance with claim 1, wherein detecting that the consumer is executing a task older than a task of the producer is a detection that the consumer is not dependent on the producer.

12. A method in accordance with claim 1, wherein detecting that the producer is executing a task older than a task of the consumer is a detection that the producer is not dependent on the consumer.

13. An apparatus for facilitating pipeline throughput in a synchronous pipeline system including a producer/consumer pair that has a producer processor and a consumer processor, the apparatus comprising:
a controller to control the producer/consumer pair to allow the producer processor and consumer processor to run out-of-sync without violating dependency, wherein the controlling includes:
monitoring dependency of the producer processor and consumer processor in the producer/consumer pair, wherein the monitoring is to monitor an age of a task of the producer processor relative to an age of a task of the consumer processor; and
determining that the producer processor and consumer processor are allowed to run out-of-sync in response to detecting that one of plural conditions is present, a first of the plural conditions including the consumer processor being sync-ahead of the producer processor and the consumer processor executing a task older than a task of the producer processor, and a second of the plural conditions including the producer processor being sync-ahead of the consumer processor and the producer processor executing a task older than a task of the consumer processor.

14. An apparatus in accordance with claim 13, further comprising a buffer to implement a further buffering delay for data transfer when the consumer processor is running sync-ahead of the producer processor.

15. An apparatus in accordance with claim 14, wherein the controller is to control the buffer to vary the time of the further buffering delay in dependence on the time by which the producer processor is running sync-ahead of the consumer processor.

16. An apparatus in accordance with claim 13, wherein the controller is to implement a processor stall domain, to individually stall processors.

17. An apparatus in accordance with claim 16, wherein the controller is to adjust a runtime relative time distance between the producer processor and consumer processor in order to maintain synchronization.

18. An apparatus in accordance with claim 13, wherein the controller is to flag when an individual processor is starting and ending a task and track when the start and/or end of tasks is being implemented by the individual processor.

19. An apparatus in accordance with claim 13, wherein the controller is to further:
in response to determining that the consumer processor is sync-ahead of the producer processor but the consumer processor is executing a task that is the same as or newer than a task of the producer processor, stall the consumer processor.

20. An apparatus in accordance with claim 13, wherein the controller is to further:
in response to determining that the producer processor is sync-ahead of the consumer processor but the producer processor is executing a task that is the same as or newer than a task of the consumer processor, stall the producer processor.

21. An apparatus in accordance with claim 13, wherein the controller is to further:
in response to determine that the producer processor is sync-ahead of the consumer processor but the producer processor is executing a task that is the same as or newer than a task of the consumer processor, stall the producer processor in response to determining that a buffer between the producer processor and consumer processor is full; and deciding to not stall the producer processor in response to determining that the buffer is not full.

22. A computer readable storage medium storing a computer program to control a synchronous pipeline, the computer program upon execution causing a controller to:

control a producer/consumer pair that includes a producer processor and a consumer processor to allow the producer processor and the consumer processor to run out-of-sync without violating dependency, where the controlling comprises:

monitoring dependency of the producer processor and consumer processor in the producer/consumer pair, wherein the monitoring is to monitor an age of a task of the producer processor relative to an age of a task of the consumer processor; and determining that the producer processor and consumer processor are allowed to run out-of-sync in response to detecting that one of plural conditions is present, a first of the plural conditions including the consumer processor being sync-ahead of the producer processor and the consumer processor executing a task older than a task of the producer processor, and a second of the plural conditions including the producer processor being sync-ahead of the consumer processor and the producer processor executing a task older than a task of the consumer processor.

* * * * *